(12) United States Patent
Kuivamäki

(10) Patent No.: US 6,515,385 B2
(45) Date of Patent: Feb. 4, 2003

(54) METHOD AND ARRANGEMENT FOR ADJUSTING DISC BRAKE IN SQUIRREL CAGE MOTOR

(75) Inventor: Ismo Kuivamäki, Vantaa (FI)

(73) Assignee: KCI Konecranes International PLC, Hyvinkää (FI)

( * ) Notice: Subject to any disclaimer, the term of this patent is extended or adjusted under 35 U.S.C. 154(b) by 0 days.

(21) Appl. No.: 09/760,841

(22) Filed: Jan. 17, 2001

(65) Prior Publication Data

US 2001/0008353 A1 Jul. 19, 2001

(30) Foreign Application Priority Data

Jan. 17, 2000 (FI) .................................... 000087

(51) Int. Cl.⁷ ............................................. H02K 7/102
(52) U.S. Cl. ........................................... 310/77; 310/93
(58) Field of Search ................. 310/75 R, 76, 310/77, 78, 92, 93, 103, 105, 106, 90; 188/196 F, 196 M, 158, 159, 161, 171, 187

(56) References Cited

U.S. PATENT DOCUMENTS

| | | | | |
|---|---|---|---|---|
| 2,351,997 A | * | 6/1944 | Morril | 188/171 |
| 2,520,204 A | | 8/1950 | Hancock | 310/77 |
| 2,536,491 A | * | 1/1951 | Chapman et al. | 310/166 |
| 2,793,306 A | | 5/1957 | Bolech | 310/77 |
| 3,407,319 A | * | 10/1968 | Arraiza | 188/161 |
| 3,502,918 A | | 3/1970 | Done et al. | 310/77 |
| 3,683,217 A | * | 8/1972 | Agalakov et al. | 310/211 |
| 4,477,743 A | * | 10/1984 | Apetrei et al. | 310/77 |
| 4,496,864 A | | 1/1985 | Apetrei et al. | 310/77 |
| 6,209,690 B1 | * | 4/2001 | Kuivamaki et al. | 188/187 |

FOREIGN PATENT DOCUMENTS

| | | |
|---|---|---|
| EP | 0742633 A2 | 11/1996 |
| EP | 0742633 A3 | 4/1999 |
| FR | 2695971 | 3/1994 |
| JP | 55018878 | 2/1980 |

* cited by examiner

Primary Examiner—Dang Dinh Le
(74) Attorney, Agent, or Firm—Birch, Stewart, Kolasch & Birch, LLP

(57) ABSTRACT

A method and an arrangement for adjusting the disc brake of a squirrel cage motor, the squirrel cage motor having a stator, a rotor arranged on a shaft of the motor and having a deflector for deflecting part of the magnetic field of the stator to a stray flux of the magnetic field of the rotor in the direction of the shaft, the motor further having an armature arranged on the shaft, a flexible element arranged between the deflector and the armature for pushing the armature away from the deflector, at least one brake disc supported to a motor frame via at least one slot, at least one trigger gear arranged on the shaft and a shaft bearing. When the motor is turned off, an air gap forms between the deflector and the armature, the size of which is adjusted with at least one adjusting piece movable inside a bearing surface in an inner ring of the bearing in the longitudinal direction of the shaft, so that the movement of the adjusting piece causes a movement of the armature in the longitudinal direction of the shaft so that the size of the air gap changes.

29 Claims, 3 Drawing Sheets

METHOD AND ARRANGEMENT FOR ADJUSTING DISC BRAKE IN SQUIRREL CAGE MOTOR

BACKGROUND OF THE INVENTION

1. Field of the Invention

The invention relates to a method of adjusting a disc brake in a squirrel cage motor comprising a stator, a rotor arranged on a shaft of the motor and comprising a deflector for deflecting part of the magnetic field of the stator to a stray flux of the magnetic field of the rotor in the direction of the shaft, the motor further comprising an armature arranged on the shaft, a flexible element arranged between the deflector and the armature for pushing the armature away from the deflector, at least one brake disc supported to a motor frame via at least one-slot, at least one trigger gear arranged on the shaft and a shaft bearing, in which method the size of an air gap between the deflector and the armature is adjusted when the motor is idle.

The invention further relates to an arrangement for adjusting a disc brake in a squirrel cage motor, the arrangement comprising a rotor arranged on a shaft of the motor and comprising a deflector for deflecting part of the magnetic field of a stator in the motor to a stray flux of the magnetic field of the rotor in the direction of the shaft, the arrangement further comprising an armature arranged on the shaft, a flexible element arranged between the deflector and the armature for pushing the armature away from the deflector, at least one brake disc supported to a motor frame via at least one slot, at least one trigger gear arranged on the shaft and a shaft bearing, whereby, when the motor is turned on, the stray flux of the magnetic field of the rotor shorts via the armature generating a magnetic axial force between the deflector and the armature in the direction of the shaft, the force attracting the armature against the deflector thus opening the brake formed by the armature, the brake disc and the trigger gear, and when the motor is turned off, the axial force between the deflector and the armature ceases, whereby the flexible element pushes the armature away from the deflector thus activating the brake and stopping the motor, whereby an air gap forms between the deflector and the armature.

2. Description of the Prior Art

Squirrel cage motors employ a disc brake structure in which part of the active length of the motor rotor forms a deflector that affects the magnetic field of the motor stator and turns part of the magnetic field of the stator in the axial direction of the motor. Said magnetic field in the axial direction of the motor, i.e. the stray flux of the magnetic field of the rotor, shorts via the armature of the motor generating a force between the deflector and the armature in the axial direction of the motor, which force tends to pull the armature against the deflector. This movement opens the brake of the motor, which is closed when the motor is idle. Then turning off the motor, the magnetic force between the deflector and the armature disappears, whereby a spring arranged on the motor shaft, between the deflector and the armature detaches the armature from the deflector and pushes the armature against the friction elements of the brake structure. Thus the brake is activated and stops the rotor. An advantage of the brake structure is that no separate winding or separate control is needed for its implementation. However, the problem is that as the friction elements of the brake wear, the distance between the deflector and the armature increases, finally increasing so large that the axial force between the deflector and the armature is no longer capable of attracting the armature against the deflector. This means that the brake is not opened, but the motor has to revolve against the torque of the brake, which may lead to burning of the motor winding. Because of the risk of burning of the winding, the air gap between the deflector and the armature has to be maintained sufficiently small, wherefore the air gap between the deflector and the armature has to be checked and/or adjusted every so often or at given intervals.

A known way to adjust the air gap between the deflector and the armature is to arrange shims between the bearing that is locked to the motor shaft with a safety ring on the side of the brake and the trigger gear locked to the shaft with cogging, the amount and thickness of which shims vary. However, the method is extremely laborious and time consuming, since a suitable combination of the amount and thickness of the shims has to be found, and the motor has to be disassembled in order to adjust the air gap.

In another known solution, the motor bearing on the side of the brake is placed in a separate bearing housing, which, in turn, is arranged with threads in a bearing plate. In this case the air gap between the deflector and the armature is adjusted by turning the bearing housing with respect to the bearing plate and by locking the turning of the bearing housing after the adjustment. The problem in this solution is that the clearances between the threads of the bearing housing and the bearing plate affect both the air slot between the stator and the rotor and the air gap between the deflector and the armature. The air gap of the brake cannot either be measured upon assembly of the motor. Furthermore, the change in the shaft bearing point due to the turning of the bearing housing may affect the operational reliability of the motor.

EP 0 742 633 discloses an electric motor comprising a deflector that is slidingly coupled to an axial shaft of the motor and deflects part of the magnetic field of the stator to an axial magnetic field. An armature is further arranged on the motor shaft, and the brake element of the motor is fixed thereto. A helical spring in interposed between the deflector and the armature. When the motor is activated, the force of the axial magnetic field attracts the armature towards the deflector, thus opening the brake. For changing the size of the air gap between the deflector and the armature, the motor shaft is provided with two bores. One of the bores extends diametrically through the shaft and is provided with a pin that is fixed to the deflector at its both ends. The second bore is in the axial direction of the motor and has an adjusting rod fixed at its one end to a pin arranged in the diametric bore of the shaft and at its other end to a threaded bolt, which is turned to move the adjusting rod in the bore so as to change the size of the air gap between the deflector and the armature. U.S. Pat. No. 4,496,864 discloses the same type of brake structure for an electric motor, wherein the size of the air gap between the deflector of the motor rotor and the motor armature is changed by moving an adjusting nut disposed in an axial bore. The movement of the adjusting nut is transmitted as a movement of the armature by means of a pin disposed in a bore extending radially through the shaft. The brake operates in principle in the same way as was described in connection with EP 0 742 633. The drawback in the solutions of both publications is that they are complex and expensive to manufacture. Axial and radial bores supplied in the motor shaft are difficult and expensive to make and they weaken the structure of the shaft and, consequently, the service life of the motor. Furthermore, the brake structures of the publications cause much work during assembly.

BRIEF SUMMARY OF THE INVENTION

The object of the present invention is to provide a simple, fast and precise manner of adjusting the disc brake of a squirrel cage motor.

The method of the invention is characterized by adjusting the size of the air gap with at least one adjusting piece movable in the longitudinal direction of the shaft between a bearing surface in an inner ring of the bearing and the shaft in such a manner that the movement of the adjusting piece makes the armature move in the longitudinal direction of the shaft thereby changing the size of the air gap between the deflector and the armature.

The arrangement of the method is characterized in that the arrangement also comprises at least one adjusting piece movable in the longitudinal direction of the shaft between a bearing surface in an inner ring of the bearing and the shaft, and means for moving said adjusting piece in such a manner that the movement of the adjusting piece causes a movement of the armature in the longitudinal direction of the shaft thereby changing the size of the air gap between the deflector and the armature.

According to the essential idea of the invention the squirrel cage motor comprises a stator and a rotor arranged on the motor shaft and comprising a deflector that deflects part of the stator magnetic field to a stray flux of the magnetic field of the rotor in the axial direction of the motor. The squirrel cage motor further comprises an armature arranged on the shaft, a flexible element arranged between the deflector and the armature for pushing the armature away from the deflector, at least one brake disc supported to the motor frame via at least one slot, at least one trigger gear arranged on the shaft and a shaft bearing, such that, while the motor is idle, an air gap forms between the rotor deflector and the armature. For the adjustment of the size of the air gap, i.e. the disc brake of the squirrel cage motor, the squirrel cage motor further comprises at least one adjusting piece movable in the longitudinal direction of the shaft between the bearing surface of the inner ring of the bearing and the shaft, and means for moving the adjusting piece so that the movement of the adjusting piece causes a movement of the armature in the longitudinal direction of the shaft so as to steplessly change the size of the air gap between the deflector and the armature. According to a preferred embodiment of the invention the end of shaft comprising the brake disc and the trigger gear is provided with threads and an adjustment nut moving in the longitudinal direction of the shaft and adapted to the threads so that the turning of the adjustment nut causes a movement of the adjusting piece in the longitudinal direction of the shaft. According to another preferred embodiment of the invention, the wearing parts of the brake of the motor are placed in a different space than the winding of the motor.

An advantage of the invention is that the adjustment of the air gap between the deflector and the armature is simple and fast since the air gap can be adjusted as desired without disassembling the motor. Furthermore, when the air gap is adjusted, the bearing point of the shaft does not change, and therefore the operational reliability of the motor remains high. A further advantage is that the motor shaft does not have to be provided with longitudinal and radial bores, which weaken the structure of the motor. The placement of the wearing parts of the brake structure in a different space than the motor winding prevents the wear products of the brake from damaging the stator winding. The braking torque may also be easily increased simultaneously by increasing the number of friction surfaces in the brake.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be described in greater detail in the attached drawings, which are given by way of illustration only, and thus are not limitative of the present invention, and in which.

DETAILED DESCRIPTION OF THE PREFERRED EMBODIMENTS

Figure 1:
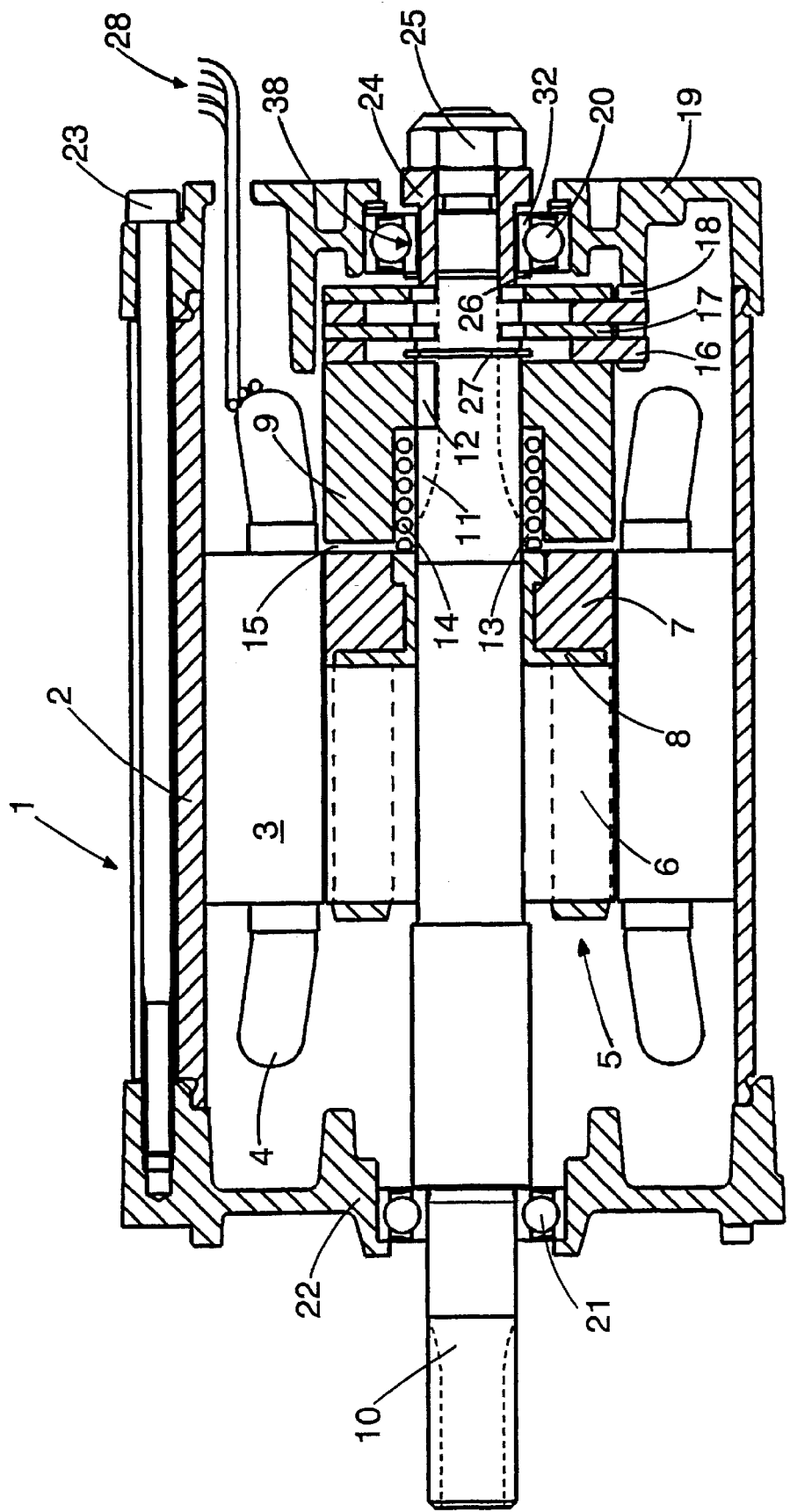
FIG. 1 is a schematic partially sectional view of an arrangement of the invention seen from the side of a squirrel cage motor.

FIG. 1 is a schematic partially sectional view of an arrangement of the invention seen from the side of a squirrel cage motor 1 for adjusting a disc brake of the squirrel cage motor 1. Below the squirrel cage motor 1 is also referred to as a motor 1. The motor 1 comprises a frame 2, a stator 3, a stator winding 4 and a rotor 5 arranged on a motor 1 shaft 10 and having a rotor winding 6 illustrated by broken lines. The rotor 5 further comprises a deflector 7, which is separated from the iron structure of the rotor 5 with non-magnetic material 8. The deflector 7 serves to deflect part of the magnetic field of the stator 3 to a magnetic field in the direction of the motor 1 shaft 10. Adjacent to the deflector 7 is an armature 9 torsionally interlocked to the shaft 10. The armature 9 is torsionally interlocked in two longitudinal grooves 11 provided in the shaft 10 in such a way that projections 12 corresponding to the grooves 11 of the shaft 10 are provided on the inner periphery of the armature 9, the projections settling into the grooves 11. The projections 12 are provided on only part of the length of the armature 9 in the direction of the shaft 10. The inner periphery of the armature 9 is provided with a space 13 for a brake spring 14 in the direction of the longitudinal axis of the motor 1 and interposed between the deflector 7 and the armature 9 such that, when the motor 1 is idle, the brake spring 14 pushes the armature 9 away from the deflector 7, an air gap 15 being provided between the deflector 7 and the armature 9. The brake spring 14 pushes the armature 9 against a brake disc 16, which is further pressed against a trigger gear 17 torsionally interlocked to the shaft 10 in the same way as the armature 9. Instead of the brake spring 14, another suitable flexible element can be used. The arrangement of FIG. 1 comprises two brake discs 16 and two trigger gears 17, but the structure of the brake may vary freely as regards the number of brake discs 16 and trigger gears 17, so that the brake comprises at least one, preferably disc-shaped brake disc 16 and at least one trigger gear 17. The motor 1 further comprises a pin 18 or slot 18 that is fixed to a flange 19 and to which the brake discs 16 are fixed so that they cannot rotate when the shaft 10 and the motor 1 parts arranged therein rotate. There are at least two slots 18, preferably three, whereby the discbrakes 16 can be firmly supported in place against the rotational motion of the shaft 10. However, the brake discs 16 are able to move in the longitudinal direction of the shaft 10 in such a way that they are pressed against the trigger gears 17 when the motor 1 brake is activated. The brake discs 16 comprise a braking friction surface, which can also be arranged on the surface of the trigger gear 17. The motor 1 shaft 10 is mounted in bearings at its both ends such that a bearing 20 on the side of the brake is supported to the flange 19 and a bearing 21 is supported to a flange 22. The bearing 20 is fixed to the shaft 10 with a fit such that the grooves 11 of the shaft 10 are unobstructed inside an inner ring 32 of the bearing 20. The motor 1 frame 2, the flange 19 and the flange 22 are tightened to each other with a bolt 23. The arrangement of FIG. 1 further comprises an adjusting piece 24 and an adjusting nut 25 for adjusting the air gap 15 between the deflector 7 and the armature 9. The adjusting piece 24 is arranged on the shaft 10 in its longitudinal direction movable in the grooves 11, i.e. the adjusting piece 24 is arranged to be movable between the inner periphery of the inner ring 32 of the bearing 20 and the shaft 10. For the adjusting nut 25, the shaft 10 is provided with a thread corresponding to the thread of the adjustment nut 25 in such a way that the adjusting piece 24 is moved in the longitudinal direction of the shaft 10 by turning the adjusting nut 25. Both the adjusting piece 24 and the adjusting nut 25 are arranged on the shaft 10 so that they both rotate as the shaft 10 rotates. The motor 1 of FIG. 1 further comprises a bearing 20 retaining ring 26 and an armature 9 retaining ring 27. The motor 1 coupling 28 to the mains or the like power source is schematically shown.

The brake of the motor 1 operates as follows. In an idle state shown in FIG. 1, the brake spring 14 pushes the armature 9 against the left brake disc 16, as seen in FIG. 1, making the disc brakes 16 press against the trigger gears 17 preventing the rotor 5 from rotating, the air gap 15 forming between the rotor 5 deflector 7 and the armature 9. When the motor 1 is activated, the rotor 5 deflector 7 deflects part of the stator 3 magnetic field to a stray flux of the magnetic field of the rotor 5 in the direction of the shaft 10. This stray flux is shorted via the armature 9 generating between the deflector 7 and armature 9 an axial force in the direction of the shaft 10 of the motor 1, the force attracting the armature 9 against the deflector 7, thus activating the brake. When the motor 1 is deactivated, the magnetic force between the deflector 7 and the armature 9 ceases, and the brake spring 14 pushes the armature 9 against the left brake disc 16, as presented above, stopping the motor 1.

As the friction surfaces in either the brake discs 16 or the trigger gears 17 wear, the air gap 15 between the deflector 7 and the armature 9 increases. The air gap 15 may increase to such an extent that the axial force caused by the stray flux of the magnetic field of the rotor 5 shorting via the armature 9 is no longer able to attract the armature 9 against the deflector 7, causing the motor 1 brake to remain actuated. In this case the motor 1 has to revolve against the torque of the brake, which may lead to burning of the motor 1 stator winding 4. For this reason, the air gap 15 between the deflector 7 and the armature 9 has to be adjusted every so often.

In the arrangement of FIG. 1, the adjustment and checking of the air gap 15 is carried out by means of the adjusting piece 24 and the adjusting nut 25 as follows. As the adjusting nut 25 is turned so that it moves to the left, seen in FIG. 1, the adjusting piece 24 adjusted movable on the same shaft 10 in the longitudinal direction of the shaft 10 moves to the left thus moving he brake discs 16, the trigger gears 17 and the armature 9 to the left. The adjusting nut 25 is moved with threads to the left as far as is reasonable, whereby the air gap 15 between the deflector 7 and the armature 9 entirely closes. The adjusting nut 25 is next turned in the opposite direction to make the adjustment nut 25 move to the right, making the air gap 15 between the deflector 7 and the armature 9 increase as the brake spring 14 pushes the armature 9, and at the same time the adjusting piece 24, the brake discs 16 and the trigger gears 17 away from the deflector 7. The size of this opening depends on the pitch of the thread of the shaft 10 and the adjusting nut 25 and the desired size of the air gap 15. The adjusting nut 25 is preferably a solid metal locknut that does not need to be separately locked. An ordinary nut can also be used as the adjusting nut 25, but it requires a bend disc to lock the adjusting nut 25 after the adjustment. Consequently, the method of the invention of adjusting the air gap 15 between the deflector 7 and the armature 9, i.e. adjusting the disc brake, is very simple, fast and stepless, and the motor 1 does not have to be disassembled to adjust the air gap 15. The size of the air gap 15 can be checked with a thickness gauge, for example. The size of the air gap 15 in a new motor is typically set between 0.1 and 1 mm depending on the size of the motor 1.

Figure 2:
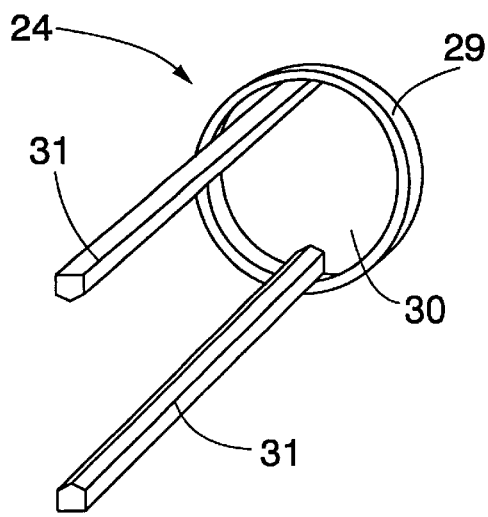
FIG. 2 is a schematic perspective view of a detail of an embodiment of the arrangement of FIG. 1.
Figure 3:
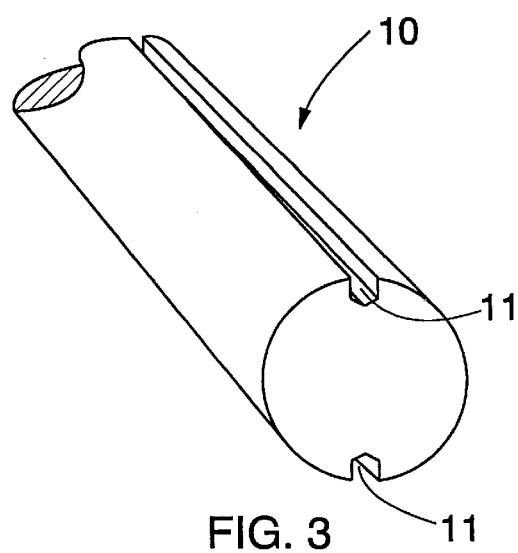
FIG. 3 is a schematic partially sectional perspective view of another detail of the arrangement of FIG. 1, corresponding to FIG. 2.

FIG. 2 is a schematic perspective view of the adjusting piece 24 of the arrangement of FIG. 1, and FIG. 3 a schematic partially sectional perspective view of the motor 1 shaft 10 corresponding to the adjusting piece 24 of FIG. 2. The adjusting piece 24 of FIG. 2 comprises a circularly symmetrical frame 29 having a hole 30 and two pegs 31 projecting from the frame 29 substantially perpendicularly with respect to the diameter of the frame 29. The adjusting piece 24 of FIG. 2 is mounted on the motor 1 shaft 10 shown in FIG. 3 such that the shaft 10 passes through the hole 30 of the adjusting piece 24 and the pegs 31 settle into the grooves 11 of the shaft 10. The adjusting piece 24 is torsionally interlocked in the direction of the shaft 10 periphery so that the adjusting piece 24 revolves with the shaft 10. The grooves 11 of the shaft 10 are so. long that they extend substantially in the longitudinal direction of the shaft 10 to that area of the shaft 10 in which the motor 1 armature 9 is arranged and in which area the armature 9 is able to move on the shaft 10. The outer diameter formed by the grooves 11 of the shaft 10 and the pegs 31 of the adjusting piece 24 is so dimensioned that the pegs 31 are never in contact with the motor 1 bearing 20, but the adjusting piece 24 is free to move in the direction of the shaft 10 in the grooves 11 between the inner ring 32 of the bearing 20 and the shaft 10. The outer diameter formed by the pegs 31 of the adjusting piece 24 is also smaller than the diameter of the bottom of the groove arranged in the shaft 10 for the retaining ring 26 of the bearing 20, allowing the adjusting piece 24 to move freely in the direction of the shaft 10 also inside the inner periphery of the retaining ring 26. The length of the pegs 31 of the adjusting piece 24 depends on the adjustment range of the air gap 15 and on the width of the brake discs 16 and the trigger gears 17 and the bearing 20 and Its retaining ring 26 in the longitudinal direction of the shaft 10.

Figure 4:
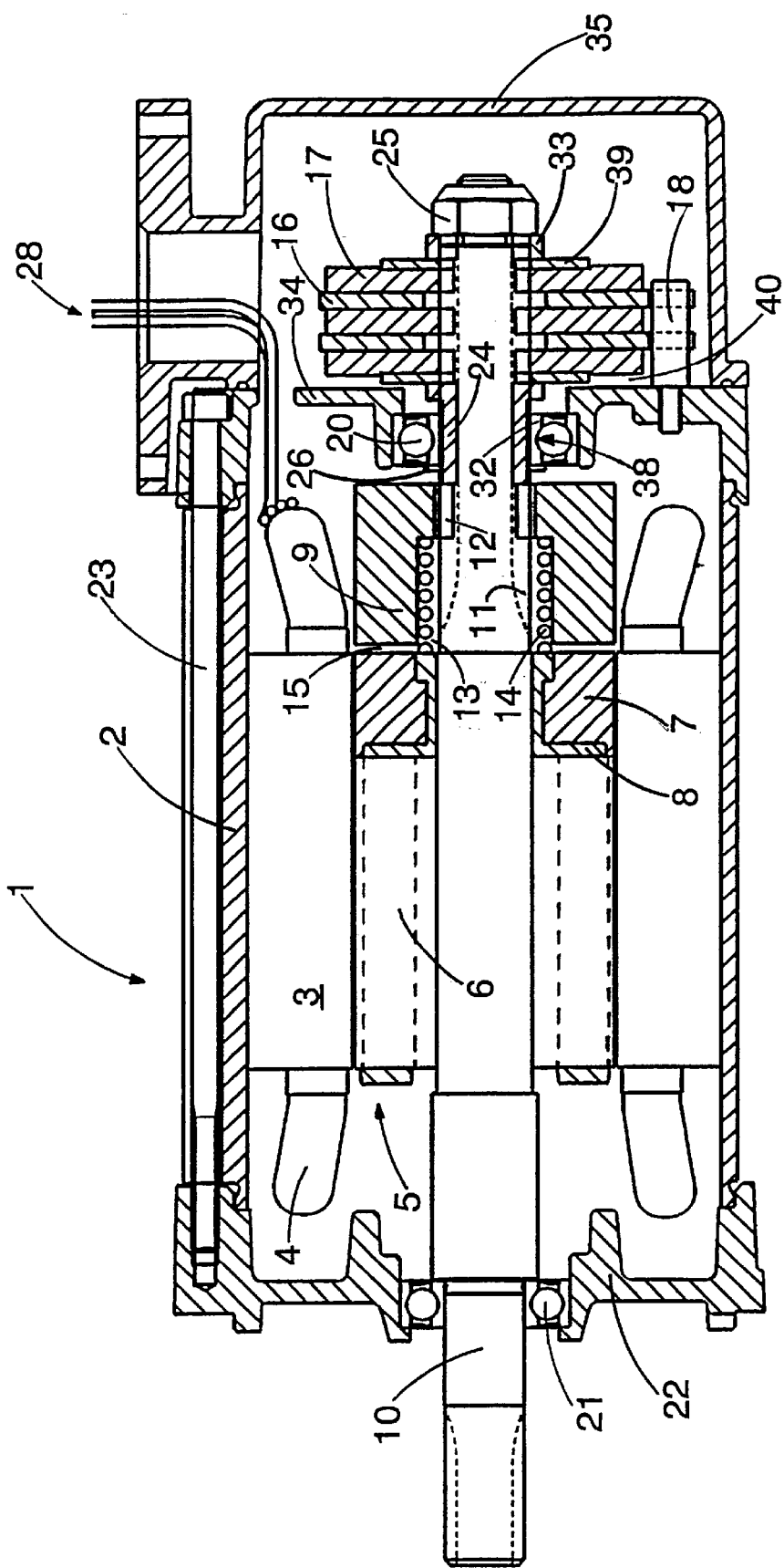
FIG. 4 is a schematic partially sectional view of a second arrangement of the invention seen from the side of a squirrel cage motor.

FIG. 4 is a schematic partially sectional view of another arrangement according to the invention seen from the side of the motor 1. The arrangement shown in FIG. 4 differs from that shown in FIG. 1 in that the adjusting piece 24 is disposed between the armature 9 and the brake system composed of the brake discs 16 and the trigger gears 17. A base plate 33 is also disposed between said brake system and the adjusting nut 25. In FIG. 4, the bearing 20 is arranged in a bearing shield 34 supported to the frame 2. The brake discs 16, the trigger gears 17, the adjustment nut 25 and the base plate 33 are shielded by a cover 35 fixed to the frame 2. Since the wearing parts of the brake are separated by the bearing shield 34 in another space than the stator winding 4 of the motor 1, brake wear products cannot damage the stator winding 4. The arrangement shown in FIG. 4 further allows the number of brake discs 16 and trigger gears 17 to be increased, and thereby the braking torque can be increased; in fact, the brake in FIG. 4 comprises three trigger gears. In FIG. 4, both sides of the brake system composed of the brake discs 16 and the trigger gears 17 are provided with brake system support plates 39 that are attached to the shaft 10 by a form fitting. In the arrangement of FIG. 4, the adjusting piece 24 is so dimensioned that a gap 40 remains between the bearing shield 34 and the trigger gear 17 adjacent to the bearing shield 34 shown in FIG. 4 so that said trigger gear 17 does not drag along the bearing shield 34. In the arrangement of FIG. 4, the air gap 15 is adjusted and checked in the same way as in the arrangement of FIG. 1.

Figure 5:
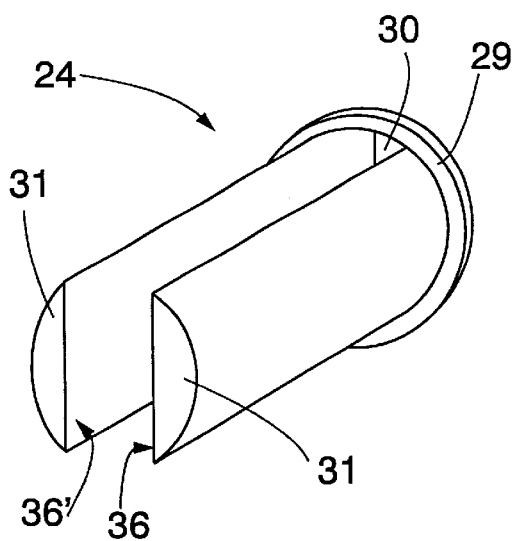
FIG. 5 is a schematic partially sectional perspective view of a detail of an embodiment of a third arrangement of the invention.
Figure 6:
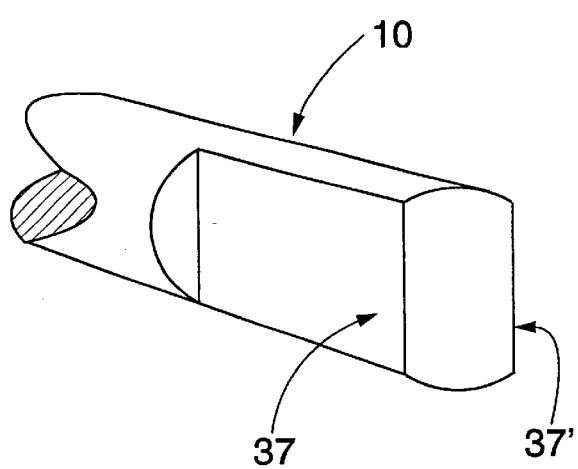
FIG. 6 is a schematic partially sectional perspective view of another detail of an arrangement of the invention, corresponding to FIG. 5.

FIG. 5 is a schematic perspective view of another adjusting piece 24 of the invention, and FIG. 6 is a schematic partially sectional perspective view of the shaft 10 of the adjusting piece 24 of FIG. 5. The adjusting piece 24 of FIG. 5 comprises a circularly symmetrical frame 29 having a hole 30 and two pegs 31 projecting from the frame 29 substantially perpendicularly with respect to the diameter of the frame 29. The pegs 31 comprise substantially parallel surfaces 36 and 36'. The shaft 10 in FIG. 6, in turn, comprises two substantially parallel surfaces 37 and 37'. The adjusting piece 24 of FIG. 5 is arranged onto the motor 1 shaft 10 shown in FIG. 6 so that the shaft 10 passes through the hole 30 of the adjusting piece 24 and the surface 36 of the adjusting piece 24 settles against the surface 37 of the shaft 10, and the surface 36' of the adjusting piece 24 settles against the surface 37' of the shaft 10. The adjusting piece 24 is torsionally interlocked to the shaft 10 in the direction of its periphery at its surfaces 36 and 36' such that the adjusting piece 24 revolves with the shaft 10. The pegs 31 and the shaft 10 surfaces 37 and 37' are dimensioned in the direction of the periphery of the shaft 10 such that the adjusting piece 24 has room to move inside the inner ring 32 and the retaining ring 26 of the bearing 20. The pegs 31 of the adjusting piece 24 and the surfaces 37 and 37' of the shaft 10 are dimensioned in the longitudinal direction of the shaft 10 so as to allow unobstructed adjustment of the air gap 15 between the deflector 7 and the armature 9.

Figure 7:
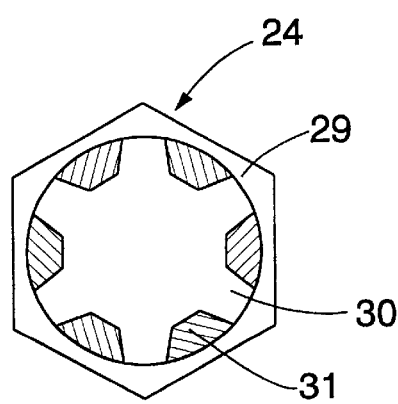
FIG. 7 is a schematic partial cross-section of a detail of an embodiment of a fourth arrangement of the invention.
Figure 8:
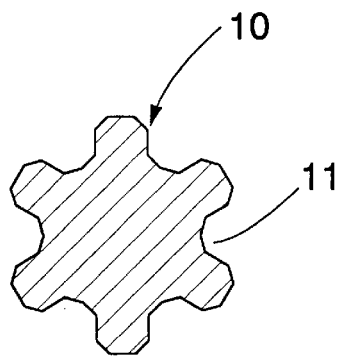
FIG. 8 is a schematic partial cross-section of a detail of another detail of an arrangement of an embodiment of the invention, corresponding to FIG. 7.

FIG. 7 is a schematic partially sectional end view of a third adjusting piece 24 of the invention, and FIG. 8 is a schematic sectional view of the shaft 10 of the adjusting piece 24 of FIG. 7. The adjusting piece 24 of FIG. 7 comprises a hexagonal frame 29 having a hole 30 and six pegs 31 projecting from the frame 29 substantially perpendicularly with respect to the diameter of the frame 29. The shaft 10 of FIG. 8 is provided with a cogging such that six grooves 11 remain between the cogging of the shaft 10. The adjusting piece 24 of FIG. 7 is arranged on the shaft 10 shown in FIG. 8 such that the shaft 10 passes through the hole 30 in the adjusting piece 24 and the pegs 31 of the adjusting piece 24 settle in the grooves 11 defined by the cogging of the shaft 10. In the direction of the periphery of the shaft 10, the adjusting piece 24 is torsionally interlocked from the pegs 31 to the grooves 11 such that the adjusting piece 24 revolves with the shaft 10. In the direction of the periphery of the shaft 10, the pegs 31 and the grooves 11 are dimensioned so as to allow the adjusting piece 24 to move in the grooves 11 of the shaft 10 inside the inner ring 32 and retaining ring 26 of the bearing 20. In the longitudinal direction of the shaft 10, the pegs 31 of the adjusting piece 24 and the grooves 11 of the shaft 10 are dimensioned so as to allow unobstructed adjustment of the air gap 15 between the deflector 7 and the armature 9.

The adjusting piece 24 and the shaft 10 can be shaped in many ways without changing the principle of the invention of adjusting the air gap 15 between the deflector 7 and the armature 9. Consequently, for adjusting the air gap 15, the adjusting piece 24 only needs to have one peg 31 and the shaft 10 only one groove 11 corresponding to the peg 31. However, in view of the operation of the motor 1, a symmetric structure is usually the best, and hence the adjusting piece 24 preferably comprises at least two pegs 31 and the shaft 10 two grooves 11 corresponding to said pegs 31. The shaft 10 is preferably cogged with six grooves 11 remaining between the cogging, the adjusting piece 24 comprising pegs 31 corresponding to the grooves 11 of the cogging. The cross-sectional shape of the pegs 31 can be freely selected, the grooves 11 on the shaft 10 being shaped to correspond to the shape of the pegs 31, or vice versa. Furthermore, the shape of the frame 29 of the adjusting piece 24 may vary, and the shape of the hole 30 in the frame 29 follows the shape of the shaft 10, or vice versa. Only one or more circular pins, for example, may also be used as the adjusting piece 24, the operation of which corresponds to that of the peg 31 of the adjusting piece 24. In this case, for example in the embodiment shown in FIG. 1, a base plate is arranged on the shaft 10, between the pin-like adjusting piece 24 and the adjusting nut 25, the inner periphery of which plate is provided with projections corresponding to the grooves 11 so that, when the adjusting nut 25 is turned, said base plate moves in the longitudinal direction of the shaft 10 simultaneously causing a movement of the pin-like adjusting piece 24, and further, a movement of the armature 9 in the longitudinal direction of the shaft 10. Furthermore, no grooves 11 have to be provided in the shaft 10 for the pegs 31 of the adjusting piece 24; instead, the inner ring 32 of the bearing 20 can be provided with borings below the bearing surface 38, through which the pegs 31 of the adjusting piece 24 can be arranged movable in the longitudinal direction of the shaft 10 between the bearing surface 38 in the inner ring 32 of the bearing 20 and the shaft 10.

The drawings and the related description are only intended to illustrate the inventive idea. The details of the invention may vary within the scope of the claims. Accordingly, for example the structure of the brake system composed of the brake discs 16 and the trigger gears 17 may vary for example on the basis of the number of brake discs 16 and trigger gears 17.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of adjusting a disc brake in a squirrel cage motor comprising a stator, a rotor arranged on a shaft of the motor and comprising a deflector for deflecting part 6f the magnetic field of the stator to a stray flux of the magnetic field of the rotor in the direction of the shaft, the motor further comprising an armature arranged on the shaft, a flexible element arranged between the deflector and the armature for pushing the armature away from the deflector, at least one brake disc supported to a motor frame via at least one slot, at least one trigger gear arranged on the shaft and a shaft bearing, in which method, when the motor is idle, the size of an air gap between the deflector and the armature is adjusted with at least one adjusting piece movable in the longitudinal direction of the shaft between a bearing surface in an inner ring of the bearing and the shaft in such a manner that the movement of the adjusting piece makes the armature move in the longitudinal direction of the shaft thereby changing the size of the air gap between the deflector and the armature.

2. The method as claimed in claim 1, wherein the adjusting piece is moved in the longitudinal direction of the shaft between the inner periphery of the inner ring of the bearing and the shaft.

3. The method as claimed in claim 1 or 2, wherein the adjusting piece is moved by means arranged on the motor shaft.

4. The method as claimed in claim 3, wherein the end of the shaft on the side of the brake disc and the trigger gear comprises threads and an adjusting nut is arranged in the threads and is movable in the longitudinal direction of the shaft, so that turning the adjusting nut causes a movement of the adjusting piece in the longitudinal direction of the shaft.

5. The method as claimed in claim 4, wherein the adjusting nut is a self-locking lock nut of solid metal.

6. The method as claimed in claim 4, wherein the adjusting nut is a usual nut that is locked with a bend disc associated therewith.

7. The method as claimed in claim 1, wherein the adjusting piece is a pin.

8. The method as claimed in claim 1, wherein the adjusting piece comprises a frame having a hole and at least one peg projecting from the frame substantially perpendicularly with respect to the diameter of the frame.

9. The method as claimed in claim 1, wherein the shaft comprises at least one groove in the longitudinal direction of the shaft or at least two substantially parallel surfaces and the inner periphery of the armature comprises a projection corresponding to the groove or surfaces corresponding to the surfaces of the shaft so as to make the armature torsionally interlock to the shaft in its peripheral direction.

10. The method as claimed in claim 9, wherein the shaft is provided with a cogging forming six grooves in the longitudinal direction of the shaft.

11. The method as claimed in claim 9, wherein the pin serving as the adjusting piece is placed in the groove such that the pin moves in the groove in the longitudinal direction of the shaft.

12. The method as claimed in claim 9, wherein the peg of the adjusting piece is placed in the groove such that the peg moves in the groove in the longitudinal direction of the shaft and the shaft passes through the hole in the frame of the adjusting piece.

13. The method as claimed in claim 9, wherein the adjusting piece comprises two pegs, both pegs having substantially parallel surfaces and the adjusting piece is placed on the shaft such that the shaft passes through the hole in the frame of the adjusting piece and the surfaces of the adjusting piece pass along the surfaces of the shaft in the longitudinal direction of the shaft simultaneously torsionally interlocking the adjusting piece to the shaft in its peripheral direction.

14. An arrangement for adjusting a disc brake in a squirrel cage motor, the arrangement comprising a rotor arranged on a shaft of the motor and comprising a deflector for deflecting part of the magnetic field of a stator in the motor to a stray flux of the magnetic field of the rotor in the direction of the shaft, the arrangement further comprising an armature arranged on the shaft, a flexible element arranged between the deflector and the armature for pushing the armature away from the deflector, at least one brake disc supported to a motor frame via at least one slot, at least one trigger gear arranged on the shaft and a shaft bearing, whereby, when the motor is turned on, the stray flux of the magnetic field of the rotor shorts via the armature generating a magnetic axial force between the deflector and the armature in the direction of the shaft, the force attracting the armature against the deflector thus opening the brake formed by the armature, the brake disc and the trigger gear, and when the motor is turned off, the axial force between the deflector and the armature ceases, whereby the flexible element pushes the armature away from the deflector thus activating the brake and stopping the motor, whereby an air gap forms between the deflector and the armature, wherein the arrangement also comprises at least one adjusting piece movable in the longitudinal direction of the shaft between a bearing surface in an inner ring of the bearing and the shaft, and means for moving said adjusting piece in such a manner that the movement of the adjusting piece causes a movement of the armature in the longitudinal direction of the shaft thereby changing the size of the air gap between the deflector and the armature.

15. The arrangement as claimed in claim 14, wherein the adjusting piece is movable in the longitudinal direction of the shaft between the inner periphery of the inner ring of the bearing and the shaft.

16. The arrangement as claimed in claim 14 or 15, wherein the means for moving the adjusting piece are arranged on the motor shaft.

17. The arrangement as claimed in claim 16, wherein the end of the shaft on the side of the brake disc and the trigger gear comprises threads and an adjusting nut arranged in the threads and movable in the longitudinal direction of the shaft, so that turning the adjusting nut causes a movement of the adjusting piece in the longitudinal direction of the shaft.

18. The arrangement as claimed in claim 17, wherein the adjusting nut is a self-locking lock nut of solid metal.

19. The arrangement as claimed in claim 17, wherein the adjusting nut is a usual nut that is locked with a bend disc associated therewith.

20. The arrangement as claimed in claim 14, wherein the adjusting piece is a pin.

21. The arrangement as claimed in claim 14, wherein the adjusting piece comprises a frame having a hole and at least one peg projecting from the frame substantially perpendicularly with respect to the diameter of the frame.

22. The arrangement as claimed in claim 14, wherein the shaft comprises at least one groove in the longitudinal direction of the shaft or at least two substantially parallel surfaces and the inner periphery of the armature comprises a projection corresponding to the groove or surfaces corresponding to the surfaces of the shaft so as to make the armature torsionally interlock to the shaft in its peripheral direction.

23. The arrangement as claimed in claim 22, wherein the shaft is provided with a cogging forming six grooves in the longitudinal direction of the shaft.

24. The arrangement as claimed in claim 22, wherein the pin serving as the adjusting piece or the peg of the adjusting piece is placed in the groove such that the shaft passes through the hole in the frame of the adjusting piece.

25. The arrangement as claimed in claim 22, wherein the adjusting piece comprises two pegs, both pegs having substantially parallel surfaces and the adjusting piece is placed on the shaft such that the shaft passes through the hole in the frame of the adjusting piece and the surfaces of the adjusting piece settle against the surfaces of the shaft in the longitudinal direction of the shaft torsionally interlocking the adjusting piece to the shaft in its peripheral direction.

26. The arrangement as claimed in claim 14, wherein the bearing is arranged in a bearing shield, which is arranged between the stator winding of the motor stator and the brake system composed of the brake disc and the trigger gear.

27. The arrangement as claimed in claim 14, wherein a base plate movable in the longitudinal direction of the shaft is arranged between the adjusting nut and the brake system composed of the brake disc and the trigger gear.

28. The arrangement as claimed in claim 14, wherein the flexible element is a spring.

29. The arrangement as claimed in claim 14, wherein there are three slots or pins supporting the brake disc to the motor frame.

\* \* \* \* \*

UNITED STATES PATENT AND TRADEMARK OFFICE
CERTIFICATE OF CORRECTION

PATENT NO.    : 6,515,385 B2
DATED         : February 4, 2003
INVENTOR(S)   : Kuivamäki Ismo It is certified that error appears in the above-identified patent and that said Letters Patent is hereby corrected as shown below:

<u>Title page,</u>
Item [30], Foreign Application Priority Data, change "Jan. 17, 2000 (FI).... 000087" to -- Jan. 17. 2000 (FI).... 20000087 --.

Signed and Sealed this

Seventh Day of October, 2003

JAMES E. ROGAN
*Director of the United States Patent and Trademark Office*